R. H. TRUBENBACH.
LEVER LOCK.
APPLICATION FILED SEPT. 14, 1915.
1,179,052.
Patented Apr. 11, 1916.
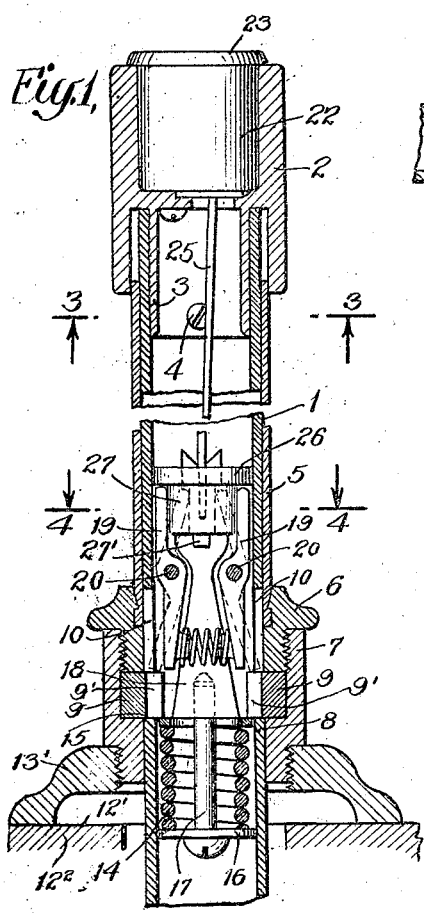
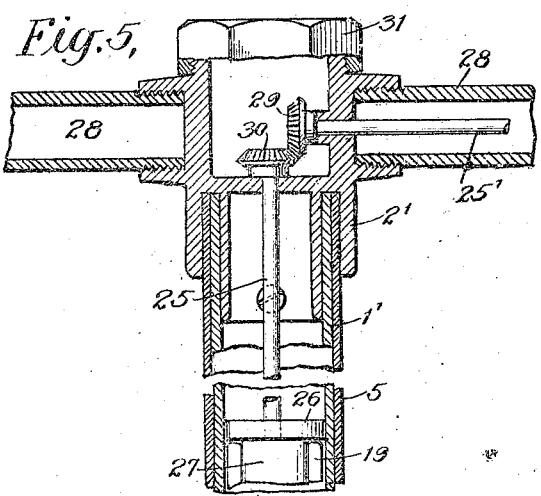
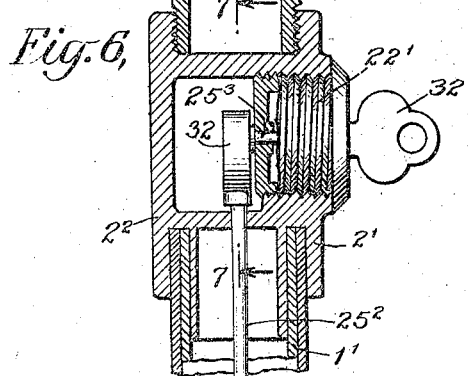
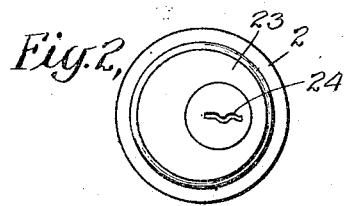
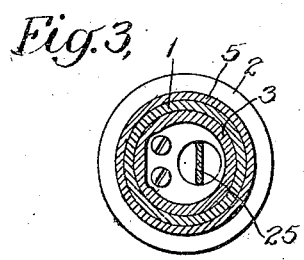
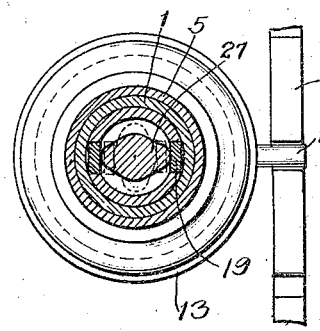
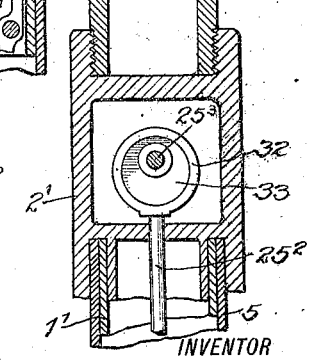
INVENTOR
Robert H. Trubenbach
BY
ATTORNEY

UNITED STATES PATENT OFFICE.

ROBERT H. TRUBENBACH, OF NEW YORK, N. Y.

LEVER-LOCK.

1,179,052.  Specification of Letters Patent.  Patented Apr. 11, 1916.

Application filed September 14, 1915. Serial No. 50,564.

*To all whom it may concern:*

Be it known that I, ROBERT H. TRUBENBACH, a citizen of the United States, residing in the city, county, and State of New York, have invented certain new and useful Improvements in Lever-Locks, of which the following is a specification.

My invention relates to locking devices applied to levers or to other rods, spokes or tubular members, to prevent movements of oscillation or rotation of the same.

Briefly, my invention comprises a chambered tubular lever or member which is adapted to be turned by the exertion of leverage, which may be locked in a desired position against further movement, by the depression or movement relative to the same of a sleeve or other actuating member; the lever or rod remaining locked until the latching devices contained within the same have been moved or released from latching position by lock-operated means, such as the operation of a lock under the control of a key in the possession of a person authorized to unlock the same.

It is evident that my invention is applicable to a large number of uses. Thus levers for use in the control of an automobile, or for shifting railway switches, or for shifting belts in a machine shop, or for controlling the operation of an elevator, may be locked in desired position, by sliding or moving an actuating member along the lever to cause the engagement of a locking lug with a notch in a quadrant, or other projection or abutment on a fixed locking plate, after which the lever can only be unlocked by an authorized person. In like manner, my invention may be applied to rods or shafts or similar members which are not strictly levers, but which have a rotary movement for the control of other apparatus such for example, as a spoke of a steering wheel, or the central rotary rod or post of the same.

The object of my invention is to provide improved devices of the character above referred to, other objects of my invention residing in the combinations of elements and details of construction hereinafter more fully described and claimed.

In order that a clearer understanding of my invention may be had, attention is hereby directed to the accompanying drawings forming part of this application and illustrating certain embodiments of my invention.

In the drawings, Figure 1 represents a central vertical section through a lever, shown as broken away, to which my invention is applied, Fig. 2 is a top plan view of the same, Figs. 3 and 4 are horizontal sections taken on the lines 3—3 and 4—4 respectively of Fig. 1, Fig. 4, however, showing a modified locking member for the lever, Figs. 5 and 6 are views similar to Fig. 1 of modified forms of my invention and Fig. 7 is a vertical section taken on the lines 7—7 of Fig. 6.

Referring first to Figs. 1 to 4 of the drawings, the lever illustrated comprises a tubular rod 1 which may be considered as pivoted at its lower end (not shown), or at some other suitable point. The handle 2 is rigidly secured to the upper end of the rod or lever 1, handle 2 being shown as having a depending sleeve 3, fitting within the upper end of tubular rod 1, and secured thereto as by means of screws 4. A sleeve 5 is slidably mounted upon the tube 1, extending at its upper end, when in raised position, into an annular opening provided for the same in handle 2. Handle 2, in the preferred form of my construction, is a cylindrical member of greater diameter than sleeve 5, the handle being adapted to be conveniently grasped in the operation of the lever. The chief object for which the handle 2 is provided is to make it unnecessary to operate the lever by grasping the sleeve 5, which latter constitutes the sliding actuating member for the lever lock.

The member 5 is not necessarily a sleeve surrounding tube 1, although I consider this the preferable form for the lock actuating member to take. Member 5 has a cylindrical member 6 secured thereto at its lower end, this being at any convenient point in the length of the lever adjacent to the position desired for the locking plate or quadrant. Member 6 in effect constitutes an enlargement on the lower end of sleeve 5 and has a cylindrical member 7 screw-threaded thereupon, or otherwise secured thereto. Member 7 is provided with an annular shoulder 8 and a collar or annulus 9 is mounted upon this shoulder, members 6 and 7 being adjusted to rigidly clamp collar 9 between the same, so that it moves with members 6 and 7 and the sleeve 5. The tubular rod 1 is longitudinally slotted on each side for a certain distance, as is indicated at 10, and member 9 has portions 9' extending through these slots on each side. Sliding member 6, 7, constitutes the locking member for the lever and in Figs. 1 and 4 it is shown as in its depressed or locking position. In the form shown in Fig. 4 a locking lug 11 is represented as carried by member 7 and as engaged between adjacent teeth of a fixed locking plate or quadrant 12. Locking projection 11 is shown as formed upon a nut 13 screw-threaded on member 7. The lower portion of member 7, below the shoulder 8, has a sliding fit on the surface of tube 1, as shown in Fig. 1. In the raised position of sleeve 5 and member 6, 7, lug 11 clears the teeth of quadrant 12 and the lever may be operated into any desired position.

An alternative means for locking the lever 1 is shown at the bottom of Fig. 1. In the construction here shown the lever is considered as one which is desirably locked only in neutral, or vertical position. The lever may, for example, be one for shifting the gears in the transmission of an automobile, in which case it might be mounted for universal movement about a point somewhat below the lower edge of Fig. 1, as shown, with an extension (not shown) of the lever, below the fulcrum, extending into the gear case. In this case, since the lever need only be locked in vertical position, it is not necessary to provide teeth or projections for the locking plate. As shown, the member 7 may have an annular, outwardly and downwardly-extending member 13' secured thereon, the lower edge of which will bear against the horizontal surface 12' of a fixed plate 12², when the sleeve 5 is pressed downwardly into locking position. The lever obviously is locked against pivotal movement in any direction when member 13' is locked in contact with surface 12'.

The sleeve 5 and locking member 6, 7, are normally held in their raised or unlocking position by the pressure of a spring within the tubular rod 1 upon member 9. Preferably, this takes the form of a spiral spring 14, mounted below member 9 and bearing at its upper end against a washer 15, which contacts the lower surfaces of the lugs 9' extending inwardly from member 9. The lower end of the spring bears against a disk 16, secured to the interior of tube 1, disk 16 preferably being secured to the lower end of a bolt or pin 17, the upper end of which is secured to a casting or frame member 18, which is secured within tube 1. A pair of latching levers 19, 19, are pivoted to the frame member 18 on pivots 20, 20. When sleeve 5 is in its upper or unlocking position, levers 19 extend vertically in the position shown in full lines in the drawing, with the lower ends of the levers extending in the spaces between the interior surface of sliding member 9 and rigid member 18, member 9 being adapted to reciprocate past the levers between the upper and lower stops formed by the upper and lower ends of slots 10. When member 9 is in its bottom position, represented in the drawing, in which it rests against the bottom edge of slot 10, the lower ends of latching levers or detents 19 are in position to clear the upper surfaces of lugs 9' on member 9 and to move laterally with respect to tube 1. A spiral spring 21 extends through an opening in casting 18, between the lower ends of the levers 19, and is adapted to move the same outwardly into the positions shown in dotted lines when member 9 has moved below the levers. In this position, member 9 is locked by levers 19 against return or upward movement to a position in which the lever or tube 1 would be unlocked.

Levers 19 can only be unlatched by an authorized person and accordingly I provide a lock-operated controlling means for the same. This preferably takes the form of a lock located in handle 2, in the lock casing 22, which is rigidly secured within handle 2 and is provided with a face plate 23 on the end of handle 2. This lock may be a combination or other lock, but is preferably key-operated, a key slot 24 being shown. A shaft 25 extends downwardly through tube 1 from the lock casing and is rotated when the proper key is inserted in the key slot 24 by the operation of the lock mechanism within casing 22, of well-known character. The lower end of shaft 25 extends through a disk 26, which is secured on the upper end of the fixed frame 18. The lower end of shaft 25 has secured thereto a cam 27 which extends downwardly between the upper ends of levers 19. The cam 27 may be rotatably supported on a vertical pivot 27', mounted in the frame 18.

When it is desired to unlock the lever for further operation of the same, cam 27 is rotated into the position shown in full lines in Fig. 1, whereby the upper ends of latching levers 19 are pressed outwardly into their full line positions so that the lower ends of the latching levers clear the inner edge of the member 9, whereupon spring 14 immediately raises member 9, sleeve 5, and the locking lug 11 into the unlocked position. So long as cam 27 remains in its position, the lever cannot be locked. When, however, the cam is rotated through 180 degrees into the position shown in dotted lines, spring 21 is free to press the latching levers into their operative position to lock member 9 down, as soon as member 9 has been depressed into its bottom or locking position.

In some cases it is not convenient to operate the lock within casing 2 from the end of the tubular rod or lever 1, as for example, when rod 1 comprises a spoke or the central rotating shaft of a steering wheel for a launch or automobile or the like. In such a case, the controlling devices may readily be positioned at right angles to the position shown in Fig. 1. In Fig. 5 such an arrangement is shown in which the tubular rod 1' represents the vertical rotating post of a steering wheel. In this case, the member 2' secured to the upper end of tubular rod 1' is represented as having tubular spokes 28 secured to the same and radiating therefrom. A shaft 25' extends through one of these spokes and is connected by bevel gears 29 and 30 with the shaft 25 which controls the operation of cam 27 in the manner already described. Shaft 25' may be operated by a lock mechanism mounted in a lock casing similar to 22 located in the rim of the steering wheel. Member 2' is represented in this figure as having a cap or nut 31 secured on the upper end thereof, to cover the opening.

It is not essential that cam 27 and shaft 25 rotate to control the operation of latching levers 19, since it is obvious that the same may be given a reciprocating movement. Such a construction is illustrated in Figs. 6 and 7 in which the cam 27' is moved vertically into and out of position, to force the latching levers 19 into inoperative position. In this case, the vertical actuating connection 25² for cam 27' does not rotate, but is given a vertical travel by securing the same to the eccentric strap 32 mounted upon an eccentric disk 33, which is mounted upon the shaft 25³, the oscillation of which may be lock-operated, in the same manner as shaft 25' in Fig. 5, as previously described. Or, as shown in the drawings, the shaft 25³ may be the revoluble shaft of a lock mounted in a lock-casing 22' in the member 2² secured to member 1', and oscillated by a key 32 inserted in the keyhole of the lock. In this case the handle member 2² need not be at the end of the member 1', a continuation of which is shown at 1ª above member 2². It is also obvious that member 25² may be given vertical movement under lock-operated control in other ways.

It is obvious that my invention is not limited strictly to the details of construction shown, the same being understood to be as broad as is indicated by the appended claims. Thus the latching detents 19 do not necessarily take the form of levers, it being only essential that the same be free to move laterally of tube 1, into position to latch member 9 in its locking position, and to be cammed or moved into inoperative position by a lock-operated controlling means. Also, in place of the movable abutment 9, 9', to be engaged by the latching levers or dogs, the latter might engage notches in member 6 or 7, when the latter is in locking position, to lock the same. It is also obvious that it is not absolutely essential that the locking and unlocking of the lever or rod be controlled from the upper end of the same.

Having now described my invention, what I claim as new therein and desire to secure by Letters Patent is as follows:—

1. In a device of the character described, the combination of a tubular lever, a handle portion rigidly mounted thereon, a sleeve slidably mounted on said lever, a locking member movable with said sleeve and adapted, in one position thereof, to engage with an abutment to lock the lever against further movement, and adapted, in another position, to clear the abutment, means within said lever for latching said locking member in said first mentioned position, resilient means tending to move said locking member out of locking position, and lock-operated means for moving said latching means out of latching position, substantially as set forth.

2. In a device of the character described, the combination of a lever having a chamber therein, a locking member slidably mounted thereon, and adapted, in one position thereof, to engage an abutment to lock the lever against further movement, and adapted, in another position, to clear the abutment, said lever having a slot extending into said chamber, and said locking member having a part movable in said slot, spring means tending to force said member out of locking position, means within said chamber for latching said member in locking position, means tending to automatically move said latching means into latching position when said member is moved into locking position, positive means for moving said latching means out of latching position, and lock-operated means for operating said last-named means, substantially as set forth.

3. In a device of the character described, the combination of a chambered rod, a sleeve mounted to reciprocate thereon, and carrying a locking lug, adapted, in one position thereof, to engage an abutment, to lock the rod against movement, and adapted, in another position, to clear the abutment, said rod having a slot therethrough, a sliding collar mounted for movement axially of said rod, in said slot, and secured to said sleeve, a spring engaging said collar tending to force said sleeve out of locking position, a latching lever within said rod, extending within said collar when said sleeve is in unlocked position, and spring-pressed into position to prevent return movement of said collar when said sleeve has been moved into locking position, and cam means for moving said latching lever out of the path of said collar, substantially as set forth.

4. In a device of the character described, the combination of a fixed locking plate, a movable longitudinally slotted and chambered rod, a locking member thereon movable axially of said rod into positions to coact with or clear said plate to lock and unlock said rod against movement, a member within said rod extending through said slot and movable with said locking member, latching means within said rod, adapted to coact with said last-mentioned member, to prevent return movement of the same, when it has been moved into locking position, and lock-operated means for moving said latching means out of latching position, substantially as set forth.

5. In a device of the character described, the combination of a fixed locking plate, a movable longitudinally slotted and chambered rod, a locking member thereon movable axially of said rod into positions to coact with or clear said plate to lock and unlock said rod against movement, a member within said rod extending through said slot and movable with said locking member, a latching lever within said rod and pivoted thereto, adapted to swing into the path of said last-mentioned member, when it has been moved into locking position, to prevent return movement of the same, and means for moving said latching lever out of the path of said member, substantially as set forth.

6. In a device of the character described, the combination of a fixed locking plate, a movable longitudinally slotted and chambered rod, a locking member thereon movable axially of said rod over said slot into positions to coact with or clear said plate to lock or unlock said rod against movement of said member having a surface comprising an abutment, a latching dog within said rod, and movable laterally thereof, into said slot when said member is in locking position, into position to contact said abutment to prevent movement of said member, means for moving said dog into operative position, and means for moving it into inoperative position, one of said means being lock-operated, substantially as set forth.

7. In a device of the character described, the combination of a fixed locking plate, a movable, longitudinally slotted and chambered rod, a locking member movable lengthwise of said slot into positions to coact with or clear said plate to lock or unlock said rod against movement, a latching dog within said rod, and movable laterally thereof, when said member is in locking position, to prevent movement of said member, spring means for moving said dog into operative position, and lock-operated means for forcing said dog into inoperative position, substantially as set forth.

8. In a device of the character described, the combination of a fixed locking plate, a movable hollow rod, having a longitudinal slot therein, a locking member extending through said slot and movable lengthwise thereof into positions to coact with or clear said plate to lock or unlock said rod against movement, a latching dog within said rod, and movable laterally thereof, when said member is in locking position, to prevent movement of said member, spring means for moving said dog into operative position, cam means for forcing said dog into inoperative position, and lock-operated means, extending through said rod, for operating said cam means, substantially as set forth.

9. In a device of the character described, the combination of a fixed locking plate, a movable hollow rod, having a longitudinal slot therein, a locking member extending through said slot and movable lengthwise thereof into positions to coact with or clear said plate to lock or unlock said rod against movement, a latching dog within said rod, and movable laterally thereof, when said member is in locking position, to prevent movement of said member, a movable sleeve about said rod, secured to said locking member, a handle member secured to said rod, having a lock therein, cam means for forcing said dog into inoperative position, and connections between said lock and cam means, operable by actuation of said lock, for operating said cam means, substantially as set forth.

10. In a device of the character described, the combination of a fixed locking plate, a movable hollow rod, having a slot therein, a locking member movable lengthwise of said slot into positions to coact with or clear said plate to lock or unlock said rod against movement, a movable sleeve about said rod, secured to said locking member, a latching dog within said rod, movable into position to prevent movement of said member, when the latter has been moved into locking position, and lock-operated means for forcing said dog into inoperative position, substantially as set forth.

This specification signed and witnessed this 10th day of September, 1915.

ROBERT H. TRUBENBACH.

Witnesses:
DYER SMITH,
I. McINTOSH.